United States Patent

Morser

[11] Patent Number: 5,374,883
[45] Date of Patent: Dec. 20, 1994

[54] METHOD AND APPARATUS FOR POSITION ERROR COMPENSATION

[75] Inventor: Alfred H. Morser, Cincinnati, Ohio

[73] Assignee: Cincinnati Milacron Inc., Cincinnati, Ohio

[21] Appl. No.: 939,335

[22] Filed: Sep. 2, 1992

[51] Int. Cl.$^5$ .............................................. G05B 19/21
[52] U.S. Cl. .................... 318/605; 318/632; 318/661
[58] Field of Search ............... 318/605, 661, 632, 600, 318/602

[56] References Cited

U.S. PATENT DOCUMENTS

| | | | |
|---|---|---|---|
| 4,362,977 | 12/1982 | Evans et al. | 318/568 |
| 4,792,739 | 12/1988 | Nakamura et al. | 318/661 |
| 4,843,291 | 6/1989 | Predina | 318/605 |
| 4,868,476 | 9/1989 | Respaut | 318/632 |
| 4,884,016 | 11/1989 | Aiello | 318/661 X |
| 4,992,716 | 2/1991 | Ellis | 318/661 |
| 5,092,051 | 3/1992 | Holmer et al. | 318/568.24 X |
| 5,134,404 | 7/1992 | Peterson | 318/605 X |
| 5,157,315 | 10/1992 | Miyake et al. | 318/568.22 X |

*Primary Examiner*—William M. Shoop, Jr.
*Assistant Examiner*—Brian Sircus
*Attorney, Agent, or Firm*—John W. Gregg

[57] ABSTRACT

Positioning errors of a moveable machine member are reduced by compensation for cyclic errors attributable to anomalies of a position transducer. Compensation values are produced which are unique only within the pitch of transducer measurement and are applied to correct the representation of measured position produced by the transducer. Positioning errors not attributable to the position transducer are corrected by compensation of position commands using compensation values associated with fixed calibration points. Use of both compensations is effective to eliminate residual errors in position correction which arise from use of calibration data created without correction of transducer cyclic errors.

19 Claims, 4 Drawing Sheets

METHOD AND APPARATUS FOR POSITION ERROR COMPENSATION

BACKGROUND OF THE INVENTION

I. Field of the Invention

This invention relates generally to numerical control of machines. In particular, this invention relates to correction of positioning errors by compensation of measured values of position and position command data.

II. Description of the Prior Art

Figure 1:
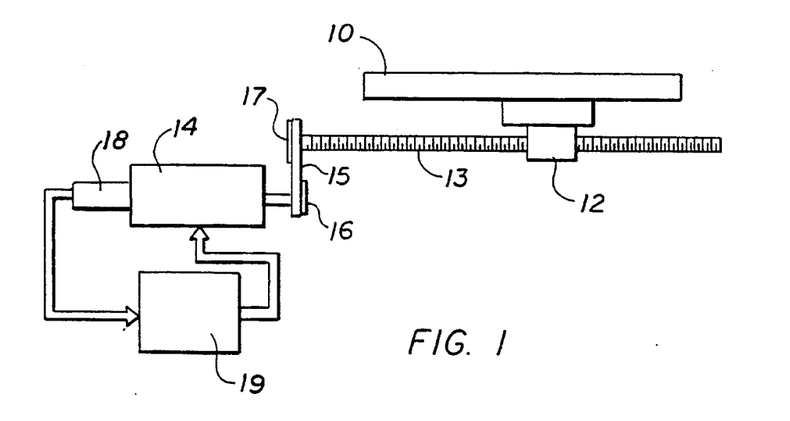
FIG. 1 illustrates a drive train for a machine moveable member.

It is well known to control machine member positioning by a closed position loop. Drive train elements of a typical axis of closed loop control are illustrated in FIG. 1. A machine member 10 is moved by motion of drive nut 12 relative to drive screw 13. Drive screw 13 is rotated by motor 14 through a transmission such as toothed belt 15 and drive wheels 16 and 17. A position transducer 18 is driven directly by motor 14 and produces signals providing unique representations of angular position throughout a single revolution of the drive shaft of motor 14. Servomechanism control 19 responds to the measured position signals and position commands produced by, for example, a numerical control to produce motor control signals controlling the operation of motor 14. Typically servomechanism control 19 will include a position loop stage for producing velocity commands in response to detected differences between commanded and actual positions, a velocity loop stage for producing motor current (torque) commands in response to detected differences between commanded and actual velocities and a drive stage for producing control signals controlling the delivery of power to the motor 14.

While the arrangement of FIG. 1 illustrates position transducer 18 as being driven directly by motor 14, it is also well known to apply position transducers to the machine members whereby position of such members is measured directly. In either arrangement, the position transducers produce unique representations of position only over a limited range consistent with the design of the type of transducer and the desired resolution of position measurement. The transducer representation of position is, therefore, repeated throughout the range of motion of the associated machine member according to the ratio of the range of motion of the machine member to that portion of the range for which the transducer produces a unique representation of position. The range of the transducer measurement is referred to herein as the transducer measurement pitch.

Although the closed loop control of position is effective to insure accurate positioning within the tolerance of the measuring system, positioning errors will nevertheless arise from sources not represented in the measured position. For example, position errors may arise from screw or nut pitch errors and eccentricities as well as from deflections in the screw, nut, and supporting machine structures. Such errors typically exhibit little variation over the pitch of transducer measurement. Even in instances where machine member position is measured directly rather than through the drive train to the actuator, anomalies in the position transducer, such as irregularities in the fields caused by slots in transducer armature and stator elements and irregularities in spacing of grating lines in optical scales, introduce position errors. Such errors define a pattern of error magnitude within the pitch of transducer measurement which repeats with each cycle of the pitch and are commonly referred to as cyclic errors.

Figure 2:
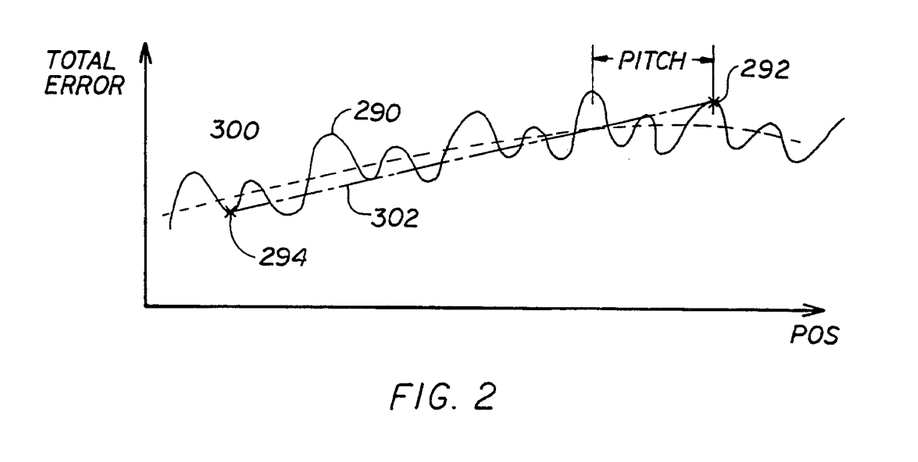
FIG. 2 illustrates the combined effects of errors compensatable by the present invention and the result of a prior art approach to compensation.

Referring to FIG. 2, curve 290 illustrates the combined effect of uncompensated cyclic and long pitch errors as a function of position. Positioning without error would occur along the horizontal axis labelled POS and positioning without cyclic error would occur along the curve represented by dashed line 300. As illustrated by curve 290, cyclic error defines a pattern within the transducer measurement pitch which is repeated over the range of motion of the machine member. In effect, cyclic errors are superposed on the curve of long pitch errors. It is known to correct errors by use of compensation values associated with selected calibration points. Common practice is to establish calibration points at regular intervals irrespective of the locations of the transducer cycles. The location of calibration points in this fashion is illustrated by the calibration points 292 and 294 shown in FIG. 2. It will be observed that the calibration data will include contributions from cyclic errors. Corrections between calibration points will be affected by these errors according to the correction algorithm using the calibration point data. As illustrated by the dot-dash line 302, a straight line joining the calibration points fails to conform to the underlying curve 300. This results in introduction of residual long pitch error on which cyclic error is superposed at all locations other than the calibration points. Consequently, although positioning will be correct at the calibration points, corrections between calibration points may be displaced from the desired correction by significant distances. Furthermore, because of the relatively small interval over which cyclic errors repeat, it is typically not practical to store calibration data tables to correct such errors throughout a range of motion of a machine member.

SUMMARY OF THE INVENTION

It is an object of the present invention to reduce machine member positioning errors attributable to anomalies of a position measuring transducer.

It is a further object of the present invention to reduce machine member positioning errors by application of compensation within the range of transducer measurement pitch.

It is a further object of the present invention to reduce machine member positioning errors by using compensation values applicable to position measuring transducers of the same type.

It is a further object of the present invention to reduce machine member positioning errors by compensation of measured position to correct for cyclic errors which are associated with a position transducer and by compensation of position commands to correct for errors of long pitch.

Further objects and advantages of the present invention shall become apparent from the accompanying drawings and the following description thereof.

In accordance with the aforesaid objects a method and apparatus are provided for reducing positioning errors of machine members by compensation of representations of measured position to correct errors occurring within a single pitch of transducer position measurement. In a first alternative technique, compensation data characteristic of all transducers of the same type are stored for selected positions throughout the pitch of transducer measurement. The compensation data are recalled according to the apparent position as represented by transducer measurement and added to the representation of position produced by the transducer. In a second alternative technique, a sinusoidal error function is evaluated according to the value of measured position. The error function is defined by a series of components, each component described by an amplitude, a phase angle and a fraction of measured position. Component amplitude and phase angle values are predetermined and used with the current value of measured position in evaluation of the error function. In addition to correction of measured position to correct for cyclic errors, position commands are compensated with calibration data stored for selected calibration points throughout the range of motion of the machine member.

DESCRIPTION OF THE PREFERRED EMBODIMENT

In order to illustrate the present invention, a computer numerical control (CNC) constituting a preferred embodiment shall be described in detail. This control corresponds to the Acramatic 950 control available from Cincinnati Milacron Inc., the assignee of the present invention. While the preferred embodiment shall be described in considerable detail, it is not the intention of applicant to limit the scope of the invention to such detail. Rather it is intended that the scope of the invention be defined by the appended claims together with all equivalents thereto.

To eliminate or reduce positioning errors described with reference to FIG. 2, applicant has recognized the need to compensate both position commands and representations of measured position. Compensation of position commands is conveniently performed in connection with the generation of such commands and compensation of measured position is conveniently performed in connection with production of the representation of measured position. As the control system in which applicant has implemented the invention uses separate and distinct components for position command generation and servomechanism control, compensation of position commands is achieved by control system elements residing outside the position control loop while compensation of measured position is effected by elements within the position control loop. Details of this arrangement shall become apparent from the following description.

Computer Numerical Control

A CNC generates path point data at a predetermined update interval in response to input data supplied in, for example, a numerical control workpiece program. The CNC, Illustrated by the block diagram of FIG. 3, includes: an operator or user interface; machine mechanism interface and control; program storage and edit facilities; machine cycle control; workpiece program interpretation; path generation control; and, servomechanism control.

Figure 3:
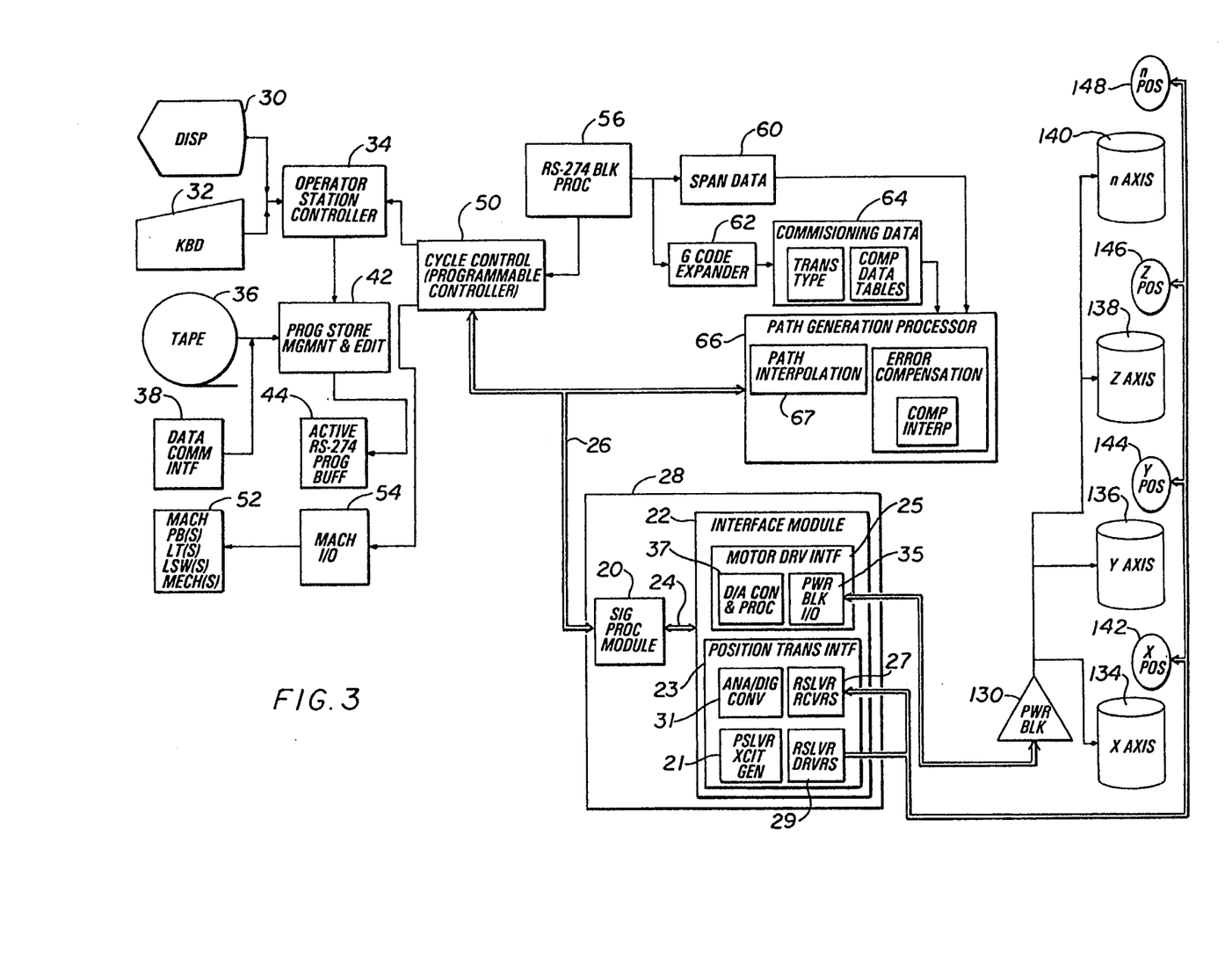
FIG. 3 is a block diagram of a machine control for effecting control of machine member positioning in accordance with the present invention.

The operator interface includes a display device 30 such as a CRT or other alphanumeric display device, a manual data entry device such as keyboard 32 and an operator station controller 34. Operator station controller 34 enables manual data input in accordance with the active mode of operation of the machine as determined by the machine cycle control.

In addition to manual data input, workpiece programs may be entered into local storage of the control by means of bulk data transfer devices such as, for example a tape reader 36 or a data communication interface 38. A program storage and edit controller 42 manages the communication of data from the input devices 36 and 38 to workpiece program buffer 44. Program instructions are transferred for execution from the active buffer 44 as required to keep pace with execution of the workpiece program.

The overall cycle of operation of the CNC is controlled by the cycle control 50. Cycle control 50 operates as a conventional programmable controller and executes control programs relating the cycle of operation of the machine with machine push buttons, lights, limit switches and mechanisms such as transmissions, tool changers, workpiece transfer devices and so forth. The machine elements are indicated generally by block 52 and are monitored and controlled through a machine input-output interface 54. In accordance with the cycle of operation of the machine, cycle control 50 effects transfer of workpiece program instructions from the active buffer 44 to a block processor 56.

Workpiece programs consist of blocks of instructions containing data defining position axis coordinates, feed rates, tool selections, spindle speeds, miscellaneous functions and cycle control codes. These programs conform to a known programming convention, such as EIA RS 274. Block processor 56 decodes each block of instructions and distributes the data as appropriate for control of machine functioning. Data required to control machine member positioning includes coordinate data specifying end points for machine member motions and cycle control codes used to effect selection of the desired mode of path generation. Motion end point data are transferred to span data store 60 from which they are supplied to path generation processor 66 as required for program controlled execution of motion. Cycle control codes are transferred to code expander 62 which operates thereon to effect selection of commissioning data from the commissioning data store 64 and to produce control signals for path generation processor 66.

Path generation processor 66 produces coordinate axis position commands for each machine position update interval in accordance with the machine operations specified by the active workpiece program instructions. Position commands are generated by execution of, for example, path point interpolation routines 67. The position commands $X_k, Y_k, Z_k, \ldots N_k$ produced by path generation processor 66 reflect the rate of change of position of all machine axes as defined by the programmed coordinates, feed rates, and cycle commands. These commands represent absolute values of position coordinates, i.e., values measured relative to a fixed reference in units of resolution selected by the user. Input resolution may be specified in any permitted unit of measurement such as inches, millimeters and degrees. The commands are converted by the control to the same units of measurement as used by the measuring systems of the controlled machine members. Measuring system units are defined by division of the transducer measurement pitch into a predetermined number of equal increments. Where the position transducer is a rotary device, the measuring system units correspond to increments of angular position which are related to machine member position according to the drive train elements. Any combination of drive transmission, screw pitch and transducer resolution is readily accommodated by the conversion of position commands to measuring system units.

Servomechanism control 28 effects closed loop control of the machine member actuators such as motors 134 through 140 in response to commands generated by path generator processor 66. Position of the actuators is measured by position transducers 142, 144, 146 and 148 mechanically driven directly or indirectly by, respectively, motors 134, 136, 138, and 140. In the preferred embodiment, resolvers are used as position transducers and the rotor relative angular position $\Theta$ is extracted from the resolver output sine and cosine amplitude data using known techniques. Actual position is expressed in measuring system units, each measuring system unit representing an increment of transducer measurement pitch.

Servomechanism Controller

Servomechanism control 28 includes an interface module 22 for exchange of signals between the CNC and the motors and position transducers. Interface module 22 includes motor drive interface 25 for signals exchanged through power block 130 for control of motors 134 through 140. Within motor drive interface 25 are power block input/output circuits 35 including signal conditioning amplifiers for control signals for power block transistors and input interfaces for measured current signals. In addition, motor drive interface includes digital to analogue converter and processor 37 which effects conversion of motor current commands to pulse width modulation control signals for the power block switching transistors.

Interface module 22 further includes position transducer interface 23 containing excitation signal interface 29 and transducer output signal receivers 27. Resolver excitation signals, fixed frequency sinusoids, are produced by resolver excitation generator 21 and conditioned by excitation signal interface 29 for output to the position transducers. Resolver output signals, $SIN_I$ and $COS_I$, are sampled at the loop closure interval and the sampled values converted from analogue to digital representations by analogue to digital converter 31.

Servomechanism control 28 effects control of motors 134 through 140 by periodic execution of control algorithms by signal processing module 20. Signal processing module 20 is a digital processor producing velocity and motor current commands in response to the position commands and measured position data by execution of programs implementing the control algorithms. Signal processing module 20 performs the functions of: interpolating sub-spans of commanded positions within each CNC update interval; calculating measured position from the transducer output data; calculating position error, i.e., the difference between sub-span position commands and measured or actual position; calculating a velocity command in response to position error; and, calculating a current command to control motor velocity.

Data is exchanged between the CNC and the digital signal processing module 20 over a system data bus 26. In applicant's preferred embodiment communication between the servomechanism control 28 and the CNC is accomplished over a data bus conforming to the signal specification of IEEE Standard 796-88 for the P1 connector. Data entered under control of the operation station controller 34 or from the workpiece program as well as data from commissioning data store 64 are all available over data bus 26 to the servomechanism controller 28. Data is exchanged between the digital signal processing module 20 and the interface module 22 via a dedicated servo control bus 24 providing independent data and address lines.

Signal Processor

Signal processing module 20 shall be described with reference to FIG. 4. Signal processing module 20 uses digital signal processors 80 and 86 to perform the calculations to generate sub-span position coordinates and current command signals for controlling machine member actuators such as motors 134 through 140. Applicant has chosen the TMS 320C25 digital signal processors available from Texas Instruments Inc. Programs executed by signal processor 80 are stored in local read only memory 84 and include: actual position calculation routines 200; position loop control routines 202; velocity loop control routines 204; and, hardware monitoring routines 208. Signal processor 86 operates in conjunction with programs stored in memory 90 including: mode and enable command processing routines 212; sub-span interpolation routines 216; and, initialization routines 220.

The signal processors 80 and 86 include built-in address and data busses which are independently connected to the signal processing module busses as will be further described herein. The data bus 26 provides separate signal lines for address data exchanged through the system bus address driver 72. System bus data is exchanged through data transceiver 74. System data bus 26 provides additional signal lines for interrupt signals which are connected at the interrupt interface 76. Local memory to support the exchange of data over bus 26 is provided in a random access memory 78. Data associated with servo system bus 24 is exchanged through the data transceiver 92 and servo system bus addresses are exchanged through the address driver 94.

Figure 4:
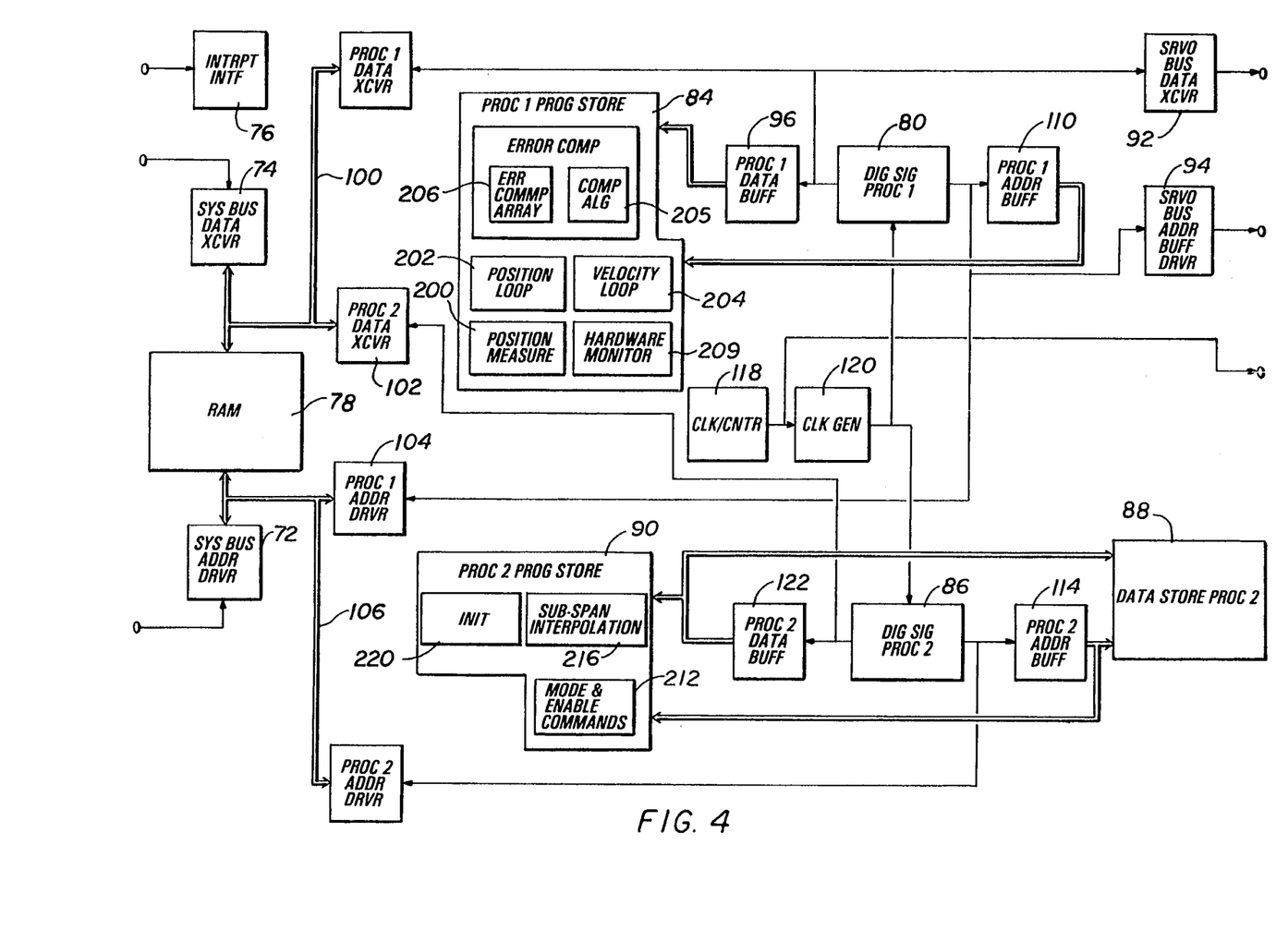
FIG. 4 is a block diagram of the signal processing module of the servomechanism control shown in FIG. 3.

Continuing with reference to FIG. 4, an oscillator and counter 118 produce outputs which are decoded as clock signals by the clock generator 120. These clock signals control the rate of execution of programs by the processors 80 and 86 and define predetermined time intervals assumed in the execution of velocity control.

The following detailed description of the procedures executed by servomechanism control 28 to effect position control includes tasks performed by both processors 80 and 86. While applicant has chosen to allocate tasks between the processors 80 and 86 in the manner to be described, it will be appreciated that other allocations would serve equally as well, the primary consideration being the processing time consumed executing all of the tasks within the loop closure interval.

The routines executed by processor 80 are subdivided into background processing effecting hardware monitoring and mode control and interrupt processing effecting position and velocity loop control. Hardware monitoring and mode control routines 208 are executed in a continuous loop until the occurrence of an interrupt associated with the loop closure interval. These routines examine status flags indicating hardware failures which may be set during initialization or at any time a hardware failure is detected. Mode control routines control the enabling of operation of the control functions of signal processing module 20.

Figure 5:
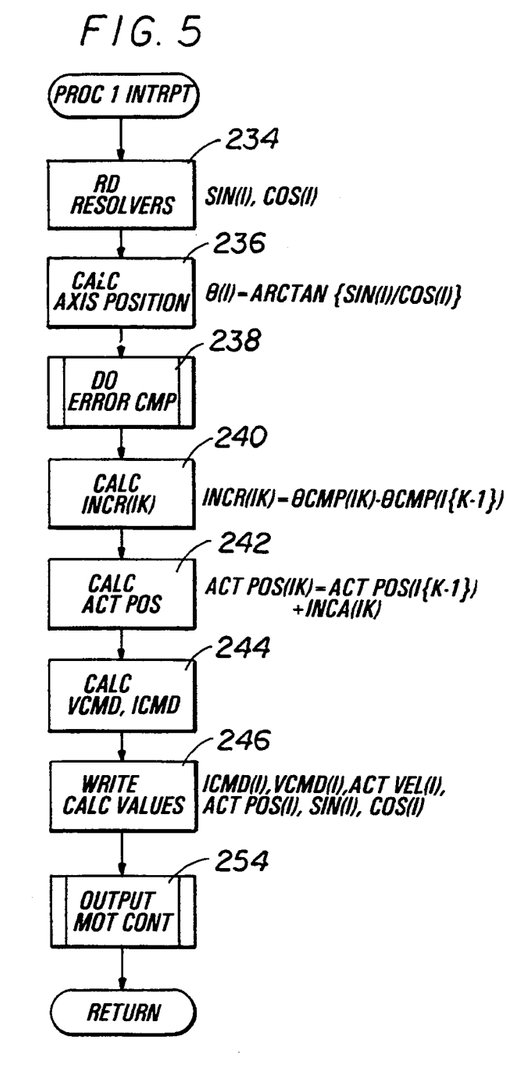
FIG. 5 is a flow chart illustrating procedures executed by the signal processing module of FIG. 4 to effect motor control.

Upon occurrence of an interrupt signal associated with the loop closure interval, execution of the procedure illustrated by the flow chart of FIG. 5 is initiated by processor 80, The interrupt procedure begins with execution of the position measurement routines 200. At process step 234 the resolver output signals $SIN_I$ and $COS_I$ for all resolvers in use are read from interface module 22. These output signals are stored by the interface module 22 in memory locations which are directly accessible by signal processing module 20. The resolver output signals read by process step 234 are loaded into dedicated locations of memory 78. At process step 236 transducer position signals $\Theta_I$ for all axes are produced by calculation of the inverse tangent of the ratio of the resolver output signals. The calculated axis positions are represented by measurement system units defining the resolution of the measured positions. At process step 238 an error compensation routine 205 is executed to correct for transducer cyclic errors. The corrected position value is used in the calculation of actual position, an absolute representation of axis position. At process step 240 an incremental change of position $INCR_{IK}$ represented by successive transducer measurements $\Theta_{IK}$ and $\Theta_{I(K-1)}$ is calculated. At process step 242 the axis absolute positions ACT $POS_I$ are calculated as the sum of each previous axis position ACT $POS_{I(K-1)}$ and the incremental change $INCR_{IK}$.

Following calculation of absolute position values, position loop routines 202 and velocity loop routines 204 are executed at process step 244 to produce velocity commands $VCMD_I$ and current commands $ICMD_I$. These values together with values of actual position ACT $POS_I$, measured velocity ACT $VEL_I$ and the transducer outputs $SIN_i$ and $COS_I$ are written to memory 78 for access by the CNC at process step 246.

Execution of the interrupt procedure continues at process step 254 where the motor current commands $ICMD_I$ are output to interface module 22. Within interface module 22, digital to analogue converter and processor 37 produces control signals in response to the motor current commands $ICMD_I$ and measured motor current. The control signals effect, for example, pulse width modulated control of transistor switches in power block 130 to control delivery of power to the motors. The control signals are output to power block 130 through interface circuits 27.

Tasks performed by signal processor 86 include: execution of initialization routines 220 background processing of mode control routines 212 which is performed continuously until the occurrence of an interrupt signal; and, interrupt procedure processing which effects execution of the sub-span interpolation routines 216 to produce the position commands employed in position loop and velocity loop control. The process for sub-span interpolation does not form a part of the present invention but details thereof are set forth in copending application entitled "Method and Apparatus for Sub-span Interpolation", U.S. Ser. No. 563,366 filed Aug. 6, 1990 and assigned to the assignee of the present invention.

Error Compensation

Compensation of errors of two types is achieved by a combination of compensations within and outside the servomechanism loop. Errors of large pitch relative to cyclic errors are conveniently compensated by modification of the position command data produced by path generator 66. These errors are conveniently compensated by interpolation between calibration points such as points 292 and 294 of FIG. 2. Table data characterizing the errors at the calibration points is determined by the machine builder and entered into the commissioning data store 64. Path generation processor 66 executes compensation interpolation routines 65 to determine compensation values between calibration points. Applicant has chosen interpolation along a straight line between calibration points although other interpolation algorithms may be used. To determine the compensation required for a particular machine position, commanded position and direction information are used in conjunction with table data according to, for example, the following:

$$C_k = C_1 + [(X_k - X_1)/(X_2 - X_1)]*(C_2 - C_1)$$

Where:
- $C_k$ is the compensation for location $X_k$ between calibration points $X_1$ and $X_2$
- $C_1$ is the compensation at calibration point $X_1$
- $C_2$ is the compensation at calibration point $X_2$
- $X_1$, $X_2$ are successive calibration points The resultant compensation value is then added directly to the command position data generated by, for example, path generator 66 to produce a compensated position command. As previously noted, compensation in accordance with this scheme but without compensation for cyclic errors introduces residual long pitch errors on which cyclic error is superposed at all locations other than the calibration points.

For cyclic position errors, which vary within distances which are relatively short compared to the pitch of the position measurement transducer, storage capacity for table values to characterize position errors over a full range of machine member motion would be excessive. In accordance with the invention, data is created to characterize such errors over the transducer pitch and used to correct position cyclically.

Applicant has determined that errors associated with transducers are characteristic of transducer types, with relatively small variation from one particular device to another of the same type. Therefore, data required to determine compensation values are determined by measurement for each transducer type of interest and sets of compensation data are stored for all such transducer types. The compensation data will, advantageously, reflect averages determined from measurements made using plural transducers of each type. The compensation values for each type are stored so as to be retrieved using data identifying the transducer type and the transducer calculated position. Transducer compensation data is stored in commissioning data store 64 for all transducer types and on control initialization, sets of data required for the transducer types in use are copied to local storage in signal processing module 20.

Figure 6:
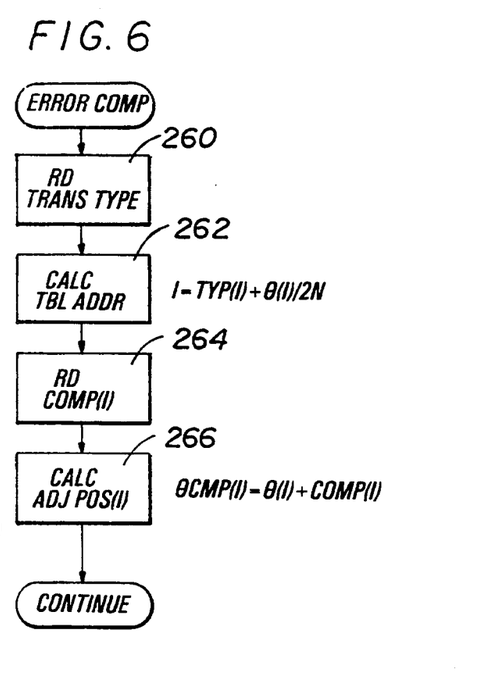
FIG. 6 is a flow chart of a procedure for compensating position errors according to a first alternative technique for compensation of measured position.

A procedure for compensation using data table values shall be described with reference to FIG. 6 representing one alternative error compensation routine executed at process step 238 of FIG. 5. At process step 260, transducer type data stored with commissioning data is read. At process step 262 a table address is calculated by adding transducer type data to a truncated value of calculated position $\Theta_I$. At process step 264 the table address is used to recall a compensation data word from the compensation data table 206 stored in the program store 84. At process step 266 the compensation word $COMP_I$ is added to the calculated value of position $\Theta_I$ to create a compensated value of position $\Theta CMP_I$.

Truncation of calculated position effectively divides the digital representation of position by 2N. The result is association of a single compensation value with a range of values of the transducer position signal. It will be appreciated that as a consequence of this approach, the error pattern within the pitch of transducer measurement will not be entirely eliminated. Applicant has determined that eight data points for each cycle within the pitch of transducer measurement of the shortest period component of the error pattern are satisfactory to correct the error in most cases. Further, applicant has found that compensation sufficient to reduce the error magnitude to less than 25% of the original error over the pitch of the transducer can be achieved in all cases with a total of 128 data points for each transducer type.

As errors of position measurement attributable to peculiarities of the position transducer exhibit sinusoidal variation over the transducer pitch, an alternative compensation technique derives the compensation value from a sinusoidal error function relating an error magnitude with the position represented by the transducer position signal and fractions thereof. The error function is conveniently described by a series of components defined by amplitudes, phase angles and fractions of the transducer position signal. In the case of resolvers, inherent magnetic symmetry results in an error function having components repeating at 2N cycles per transducer measurement pitch with a contribution from the fundamental pitch cycle. The periods of these components correspond to fractions of the transducer position signal. Applicant has determined that the $6^{th}$ pitch multiple component appears not to occur and that the error functions typically contain no more than three other 2N pitch multiple components. The resulting error function may be described as follows:

$$E_\Theta = A_1 \sin(\phi_1+\Theta) + A_2 \sin(\phi_2+\Theta/2) + A_4 \sin(\phi_4+\Theta/4) + A_8 \sin(\Theta_8+\Theta/8)$$

Where:
  $E_\Theta$ is the total error magnitude
  $A_I$ is the amplitude of the contribution of the $i^{th}$ fraction of position
  $\phi_I$ is the phase shift between position and the $i^{th}$ fraction of position
  $\Theta$ is the transducer angle and $\Theta/I$ is the $i^{th}$ fraction of position The phase angles $\Theta_I$ and amplitude magnitude values $A_I$ are stored for use in subsequent evaluation of the error function. As with the data table compensation technique, these values are stored with the commissioning data for each resolver type.

Figure 7:
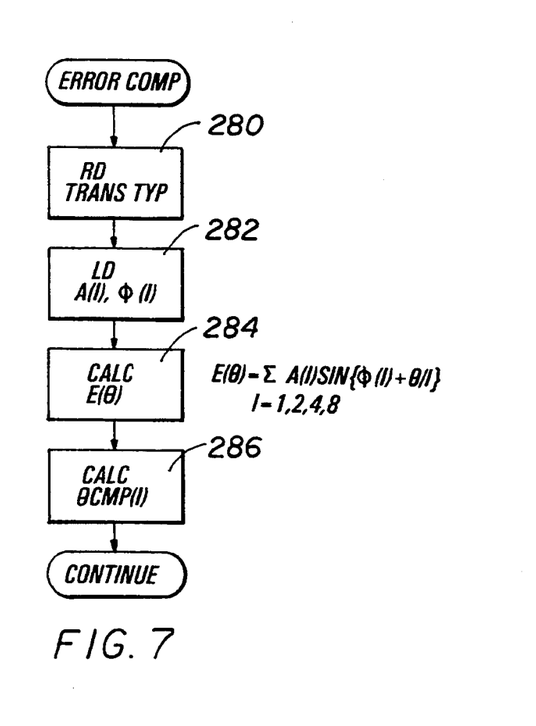
FIG. 7 is a flow chart of a procedure for compensating position error according to a second alternative technique for compensation of measured position.

A procedure for compensating measured position values by evaluation of the error function shall be described with reference to FIG. 7. At process step 280 resolver type data is retrieved from the commissioning data store. At process step 282 the phase angles $\phi_I$ and amplitude magnitude values $A_I$ for the selected resolver types are recalled from storage and loaded to local registers. At process step 284 the value of the error function is calculated using the calculated value of position $\phi$ produced by step 236 of FIG. 5, the phase angles $\phi_I$ and the amplitude magnitude values $A_I$ recalled from storage. At process step 286 a compensated position value is produced in response to the value of the calculated position and the value of the error function magnitude.

In applicant's preferred embodiment digital signal processor 80 performs fixed decimal point computations. Consequently, with this processor, use of a sine function compensation algorithm is prohibitively calculation intensive. This computational inefficiency may be overcome by a processor performing floating point calculations.

What is claimed is:

1. A method of controlling operation of an actuator for effecting motion of a moveable member of a machine, the position of the moveable member being detected by a transducer having a rotor and stator moveable relative each to the other and producing output signals correlated to the relative position of the rotor and stator so as to define a transducer measurement pitch within which the relative position of the rotor and stator are uniquely determinable from the output signals and at least a portion of which is repeated within the range of motion of the machine member, the method comprising the steps of:

a. producing a position command signal representing a position at which the moveable member is to be located;

b. producing a transducer position signal in response to the transducer output signals, the transducer position signal representing the relative position of the rotor and stator within the transducer measurement pitch;

c. producing a compensation signal in response to the transducer position signal and predetermined position error data characteristic of all transducers of the same transducer type, the compensation signal representing a difference between the value of the transducer position signal and the actual relative position of the rotor and stator at the relative position represented by the transducer position signal and having unique values only within the range of transducer measurement pitch;

d. producing a compensated position signal in response to the transducer position signs and the compensation signal, the compensated position signal representing a position value corrected according to the value of the compensation signal;

e. controlling the actuator in response to the command signal and the compensated position signal.

2. The method according to claim 1 wherein the position error data comprises a table of predetermined compensation values and the step of producing a compensation signal further comprises the step of selecting from the table of predetermined compensation values a compensation value ascribed to a range of values of the transducer position signal.

3. The method of claim 2 wherein the table of predetermined compensation values includes sets of compensation values for plural types of transducers and the step of selecting a compensation value further includes the step of producing a transducer type signal for selecting the set of compensation values for a selected type of transducer.

4. The method according to claim 1 wherein the step of producing a compensation signal further comprises the step of evaluating a sinusoidal error function relating an error magnitude and the transducer position signal.

5. The method according to claim 4 wherein the sinusoidal error function is defined by a series of components, each component described by an amplitude, a phase angle and a fraction of the transducer position signal, the amplitude values and phase angle values being characteristic of a transducer of a particular type and the step of evaluating the error function further comprises the step of selecting a set of amplitude and phase angle values for a selected type of transducer.

6. The method of claim 5 wherein the error function includes components defined by the whole and the half, quarter and eighth fractions of the transducer position signal.

7. A method for controlling operation of an actuator for effecting motion of a moveable member of a machine, the position of the moveable member being detected by a transducer having a rotor and stator moveable relative each to the other and producing output signals correlated to the relative position of the rotor and stator so as to define a transducer measurement pitch within which the relative position of the rotor and stator are uniquely determinable from the output signals and at least a portion of which is repeated within the range of motion of the machine member, the method comprising the steps of:
  a. producing a position command signal representing a position at which the moveable member is to be located;
  b. producing an interpolatecd compensation signal representing a compensation value interpolated between two compensation values associated with successive calibration points between which lies the position represented by the command signal;
  c. producing a compensated command signal in response to the command signal and the interpolated compensation signal, the compensated command signal representing a command position corrected according to the value of the interpolated compensation signal;
  d. producing a transducer position signal in response to the transducer output signals, the transducer position signal representing the relative position of the rotor and stator within the transducer measurement pitch;
  e. producing a compensation signal in response to the transducer position signal and predetermined position error data characteristic of all transducers of the same transducer type, the compensation signal representing a difference between the value of the transducer position signal and the actual relative position of the rotor and stator at the relative position represented by the transducer position signal and having unique values only within the range of transducer measurement pitch;
  f. producing a compensated position signal in response to the transducer position signal and the compensation signal, the compensated position signal representing a position value corrected according to the value of the compensation signal;
  g. controlling the actuator in response to the compensated command signal and the compensated position signal.

8. The method according to claim 7 wherein the step of producing a compensation signal further comprises the step of selecting from a table of predetermined compensation values, a compensation value ascribed to a range of values of the transducer position signal.

9. The method of claim 8 wherein the table of predetermined compensation values includes sets of compensation values for plural types of transducers and the step of selecting a compensation value further comprises the step of producing a transducer type signal for selecting the set of compensation values for a selected type of transducer.

10. The method according to claim 7 wherein the step of producing a compensation signal further comprises the step of evaluating a sinusoidal error function relating an error magnitude and the transducer position signal.

11. The method according to claim 10 wherein the sinusoidal error function is defined by a series of components, each component described by an amplitude, a phase angle and a fraction of the transducer position signal, the amplitude values and phase angle values being characteristic of a transducer of a particular type and the step of evaluating the error function further comprises the step of selecting a set of amplitude and phase angle values for a selected type of transducer.

12. The method of claim 11 wherein the error function includes components defined by the whole, half, quarter and eighth fractions of the transducer position signal.

13. An apparatus or controlling operation of an actuator for effecting motion of a moveable member of a machine, the position of the moveable member being detected by a transducer having a rotor and stator moveable relative each to the other and producing output signals correlated to the relative position of the rotor and stator so as to define a transducer measurement pitch within which the relative position of the rotor and stator are uniquely determinable from the output signals and at least a portion of which is repeated within the range of motion of the machine member, the apparatus comprising:
  a. means for producing a position command signal representing a position at which at which the movable member is to be located;
  b. means for producing a transducer position signal in response to the transducer output signals, the transducer position signal representing the relative position of the rotor and stator within the transducer measurement pitch;
  c. means for producing a compensation signal in response to the transducer position signal and predetermined position error data characteristic of all transducers of the same transducer type, the compensation signal representing a difference between the value of the transducer position signal and the actual relative position of the rotor and stator at the position represented by the transducer position signal and having unique values only within the range of transducer measurement pitch;

d. means for producing a compensated position signal in response to the translucent position signal and the compensation signal, the compensated position signal representing a position value corrected according to the value of the compensation signal;

e. means for controlling the actuator in response to the command signal and the compensated position signal.

14. The apparatus of claim 13 wherein the position error data comprises a table of predetermined compensation values and the means for producing a compensation signal further comprises means for selecting a compensation value from the table of predetermined compensation values, each compensation value being associated with a range of values of the transducer position signal.

15. The apparatus of claim 14 wherein the table of predetermined compensation values includes sets of compensation values for plural types of transducers and the means for selecting a compensation value further comprises means for producing a transducer type signal for selecting the set of predetermined compensation values for a selected type of transducer.

16. The apparatus of claim 13 wherein the means for producing a compensation signal further comprises the means for evaluating a sinusoidal error function relating an error magnitude and the transducer position signal.

17. The apparatus of claim 16 wherein the sinusoidal error function is defined by a series of components, each component described by an amplitude, a phase angle and a fraction of the transducer position signal, the amplitude values and phase angle values being characteristic of a transducer of a particular type and the means for evaluating the error function further comprises means for selecting a set of amplitude and phase angle values for a selected type of transducer.

18. The apparatus of claim 17 wherein the error function includes components described by the whole and the half, quarter and eighth fractions of the transducer position signal.

19. The apparatus of claim 13 further comprising:

means for producing an interpolated compensation signal representing a compensation value interpolated between two compensation values associated with successive calibration points between which lies the position represented by the command signal; and means for compensating the command signal in response to the interpolated compensation signal and prior to control of the actuator by the command signal, the compensated command signal representing a command position corrected according to the value of the interpolated compensation signal.

* * * * *